United States Patent
Morey

(10) Patent No.: US 10,047,707 B2
(45) Date of Patent: Aug. 14, 2018

(54) SYSTEM AND METHOD FOR COOLING CHARGE AIR AND EXCESS FUEL FOR A TURBOCHARGED DIESEL ENGINE

(71) Applicant: CNH Industrial America, LLC, New Holland, PA (US)

(72) Inventor: Daniel Morey, Mundelein, IL (US)

(73) Assignee: CNH Industrial America LLC, New Holland, PA (US)

( * ) Notice: Subject to any disclaimer, the term of this patent is extended or adjusted under 35 U.S.C. 154(b) by 170 days.

(21) Appl. No.: 14/729,185

(22) Filed: Jun. 3, 2015

(65) Prior Publication Data
US 2016/0356249 A1    Dec. 8, 2016

(51) Int. Cl.
*B60K 13/02* (2006.01)
*F02M 35/10* (2006.01)
(Continued)

(52) U.S. Cl.
CPC ....... *F02M 35/10268* (2013.01); *B60K 13/02* (2013.01); *B60K 15/01* (2013.01); *F01P 3/00* (2013.01); *F02B 29/0462* (2013.01); *F02B 29/0475* (2013.01); *F02M 31/20* (2013.01); *F02M 35/10157* (2013.01); *F02M 35/10216* (2013.01); *F01P 2060/02* (2013.01); *Y02T 10/126* (2013.01); *Y02T 10/144* (2013.01); *Y02T 10/146* (2013.01)

(58) Field of Classification Search
CPC .................... B60K 13/02; B60K 15/01; B60K 2015/03414; B60K 2015/0348; F02M 31/20; F02M 35/10268; F02M 35/10242; F02B 29/0475; F02B 29/0462; F02B 29/045; F02B 29/0456
See application file for complete search history.

(56) References Cited

U.S. PATENT DOCUMENTS

| 4,778,002 A | 10/1988 | Allgauer et al. |
| 4,875,439 A * | 10/1989 | Widmer ................ F02M 31/20 123/541 |

(Continued)

FOREIGN PATENT DOCUMENTS

| DE | 19907267 A1 * | 8/2000 | ............... F01P 7/16 |
| EP | 2915989 B1 * | 4/2017 | ....... F02M 35/10268 |
| WO | 97/33078 | 9/1997 | |

OTHER PUBLICATIONS

Summit/Flex-a-lite. Dated Jan. 13, 2015, (2 pages). Website www.summitracing.com.

(Continued)

*Primary Examiner* — James A Shriver, II
*Assistant Examiner* — Steve Clemmons
(74) *Attorney, Agent, or Firm* — Rickard K. DeMille; Rebecca L. Henkel

(57) ABSTRACT

A system for cooling charge air and excess fuel for a turbocharged diesel engine includes a charge air cooler having an inlet body, a heat exchanger that is disposed downstream from the inlet body and an outlet body that is disposed downstream from the heat exchanger. The outlet body defines a flow passage in fluid communication with the heat exchanger. The system further includes a fuel passage that is in thermal communication with the flow passage of the outlet body. A method for cooling excess fuel from the turbocharge diesel engine is also disclosed herein.

12 Claims, 6 Drawing Sheets

(51) Int. Cl.
  *F01P 3/00* (2006.01)
  *F02B 29/04* (2006.01)
  *F02M 31/20* (2006.01)
  *B60K 15/01* (2006.01)

(56) References Cited

U.S. PATENT DOCUMENTS

| | | | |
|---|---|---|---|
| 4,924,838 A | 5/1990 | McCandless | |
| 5,964,206 A * | 10/1999 | White | F02M 31/20 123/541 |
| 6,457,460 B1 * | 10/2002 | Doane | F02M 31/20 123/497 |
| 6,718,954 B2 | 4/2004 | Ryon | |
| 6,796,134 B1 | 9/2004 | Bucknell et al. | |
| 6,848,433 B2 | 2/2005 | Scoggins | |
| 7,367,292 B2 * | 5/2008 | Vath | F02M 31/20 123/41.31 |
| 7,406,929 B2 * | 8/2008 | Hassdenteufel | F01P 3/20 123/41.1 |
| 7,806,091 B2 | 10/2010 | Esau et al. | |
| 7,836,867 B2 | 11/2010 | Chyo et al. | |
| 8,006,675 B2 | 8/2011 | Chyo et al. | |
| 8,251,046 B2 * | 8/2012 | Brown | F02M 31/20 123/445 |
| 8,439,019 B1 | 5/2013 | Carlson et al. | |
| 8,733,327 B2 | 5/2014 | Diem et al. | |
| 8,813,489 B2 | 8/2014 | Didelot et al. | |
| 9,618,282 B2 * | 4/2017 | Kim | F28F 9/0234 |
| 2006/0113068 A1 * | 6/2006 | Desai | F28D 1/0417 165/140 |
| 2012/0325181 A1 | 12/2012 | Burke | |
| 2013/0220289 A1 | 8/2013 | Maceroni et al. | |
| 2014/0245735 A1 | 9/2014 | Kuske et al. | |
| 2016/0102602 A1 | 4/2016 | Appleton | |

OTHER PUBLICATIONS

MMC/Combines Cooler. Dated Jan. 14, 2015, (3 pages).Website www.ktr.com.
Rocore/Cooler Packages. Dated Jan. 14, 2015, (2 pages). Website www.modine.com.
European Search Report for European Application No. 16170277.4 dated Oct. 10, 2016 (5 pages).

* cited by examiner

SYSTEM AND METHOD FOR COOLING CHARGE AIR AND EXCESS FUEL FOR A TURBOCHARGED DIESEL ENGINE

FIELD OF THE INVENTION

The present subject matter relates generally to work vehicles and, more particularly, to a system and a method for cooling charge air and excess fuel for a turbocharged diesel engine.

BACKGROUND OF THE INVENTION

A work vehicle may be powered by a diesel engine. In order to meet emissions and performance requirements, modern diesel engines are typically turbocharged and use electronic, fuel injection systems. In operation, air flows into the turbocharger where it is compressed. The compressed or charged air is introduced into a combustion chamber of the diesel engine where it is mixed with an atomized diesel fuel to form a combustible fuel-air mixture within the combustion chamber. An excess portion of the diesel fuel is not injected into the combustion chamber. This excess portion of fuel is used for lubricating and/or cooling various internal components of the diesel engine fuel injection system and is then reintroduced into the fuel supply.

It is generally beneficial to cool the charged air upstream from the combustion chamber so as to lower the combustion temperature, reduce formation of oxides of nitrogen or NOx emissions and to improve fuel economy. In addition, it is typically necessary to cool the excess fuel before it is reintroduced into the combustion chamber and/or mixed with fresh fuel from the fuel supply so as to not exceed thermal limits set by the fuel injection equipment manufacturers.

Cooling of the charged air and the fuel is provided by two individual cooling systems of the work vehicle. For example, a work vehicle typically includes a Charge Air Cooler (CAC) having an air-to-air or liquid-to-air heat exchanger for cooling the charge air. The work vehicle also includes an air-to-air or liquid-to-air heat exchanger for cooling the unburned fuel. Having multiple cooling systems generally contributes to the overall manufacturing costs to build the work vehicle and may increase repair/maintenance costs to maintain the work vehicle in an operating condition. Accordingly, an improved system for cooling charge air and fuel for a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for cooling charge air and excess fuel for a turbocharged diesel engine. The system includes a charge air cooler having an inlet body, a heat exchanger that is disposed downstream from the inlet body and an outlet body that is disposed downstream from the heat exchanger. The outlet body defines a flow passage in fluid communication with the heat exchanger. The system further includes a fuel passage that is in thermal communication with the flow passage of the outlet body.

In another aspect, the present subject matter is directed to a work vehicle. The work vehicle includes a chassis, a drivetrain that is attached to the chassis and includes a turbocharged diesel engine and a transmission. A fuel supply is in fluid communication with the diesel engine. The work vehicle further includes a system for cooling charge air from the turbocharger and excess fuel from the diesel engine. The system includes a charge air cooler having an inlet body that is downstream from the turbocharger, a heat exchanger that is disposed downstream from the inlet body and an outlet body that is disposed downstream from the heat exchanger. The outlet body defines a flow passage that is in fluid communication with the heat exchanger. The system further includes a fuel passage that has an inlet that is in fluid communication with a fuel outlet of the diesel engine and an outlet that is in fluid communication with the fuel supply. The fuel passage is in thermal communication with the flow passage of the outlet body.

In a further aspect, the present subject matter is directed to a method for cooling charge air and fuel for a diesel engine. The method includes cooling heated charge air from a turbocharger via a charge air cooler to provide a cooled charge air to a flow passage defined by an outlet body of the charge air cooler. The method also includes flowing excess fuel from the diesel engine through a fuel passage that is in thermal communication with the flow passage of the outlet body. The method further includes transferring thermal energy from the excess fuel to the cooled charge air to provide a cooled excess fuel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
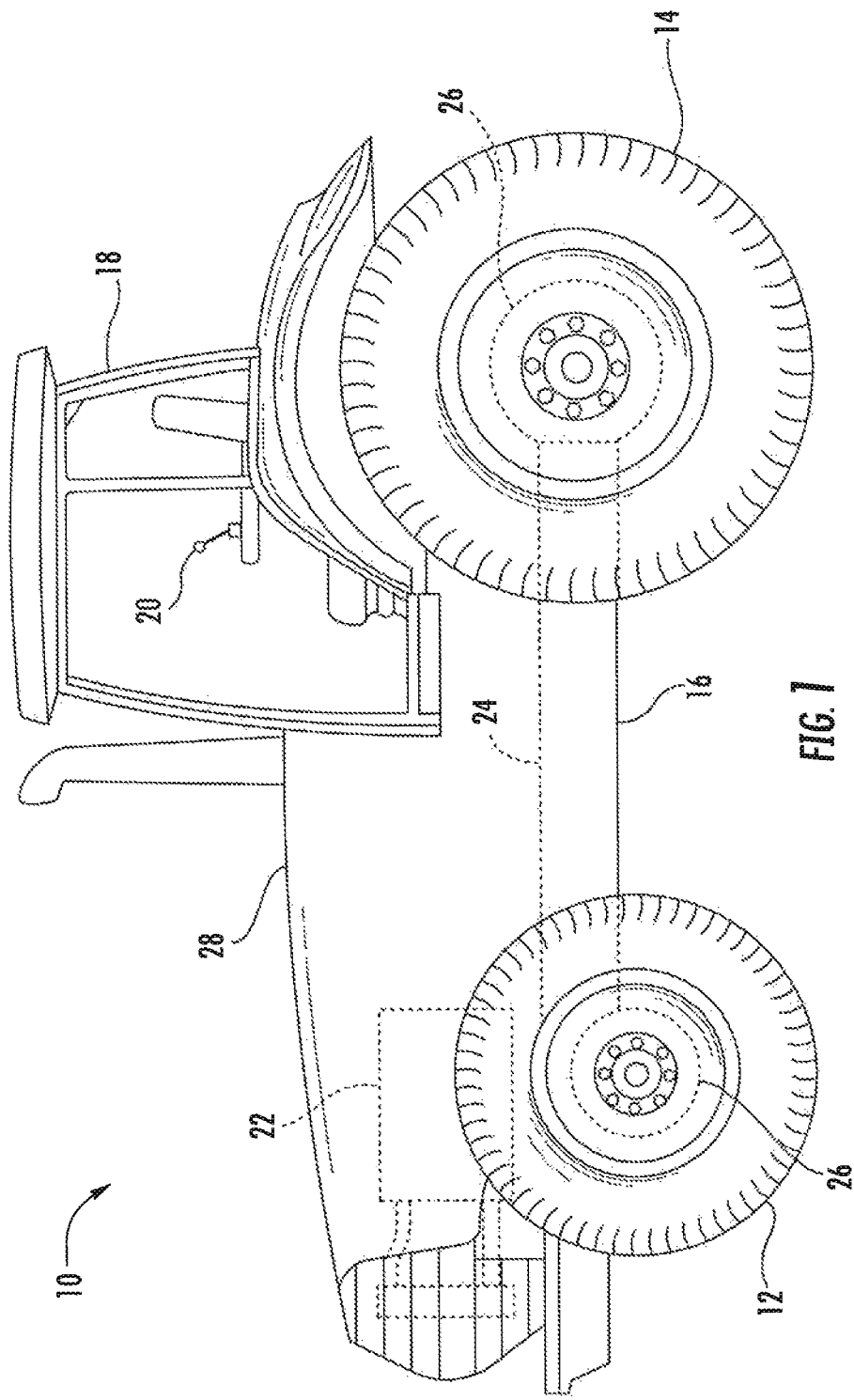
FIG. 1 illustrates a side view of one embodiment of a work vehicle as may incorporate various embodiments of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "laterally" refers to the relative direction that is substantially perpendicular to a longitudinal centerline of a particular component, and the term "longitudinally" refers to the relative direction that is substantially parallel to a longitudinal centerline of a particular component.

In general, the present subject matter is directed to a system and method for cooling charge air and excess fuel from a turbocharged diesel engine of a work vehicle. Specifically, in several embodiments, the system corresponds to a fuel passage that is in fluid communication with a fuel outlet of a diesel engine, in thermal communication with a flow passage of an outlet body of a charge air cooler and is also in fluid communication with a fuel supply or tank.

For example, as will be described in greater detail below, hot excess fuel from the diesel engine may be circulated through the fuel passage. Thermal energy from the hot excess fuel is transferred via conduction and/or convection heat transfer to a cooled charge air flowing though the flow passage of outlet body. This invention provides a compact design which uses space within the outlet body to provide cooling rather than packing separate external components within the generally limited space of a work vehicle for cooling fuel and for cooling the charge air flowing from the turbocharger. The invention may reduce overall part/manufacturing, costs, reduce part count, may reduce/eliminate potential issues with debris plugging fuel cooler fins, reduce air side restriction for the cooling module thus resulting in lower pressure drop, less fan noise, and lower fan power losses.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12 (only one shown), a pair or rear wheels 14 (only one shown) and a chassis 16 coupled to and supported by the wheels 12, 14. An operator's cab 18 may be supported by a portion of the chassis 16 and may house various control or input devices 20 (e.g., levers, pedals, control panels, buttons and/or the like) for permitting an operator to control the operation of the work vehicle 10. In addition, the work vehicle 10 includes a diesel engine 22 that is turbocharged and a transmission 24 mounted on the chassis 16. The transmission 24 may be operably coupled to the diesel engine 22 and may provide variably adjusted gear ratios for transferring engine power to the wheels 12 and/or 14 via an axle/differential 26. The diesel engine 22, transmission 24, and axle/differential 26 may collectively define a drivetrain of the work vehicle 10. The diesel engine 22 may be at least partially encased or surrounded by a body or cowling 28.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the diesel engine 22, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Figure 2:
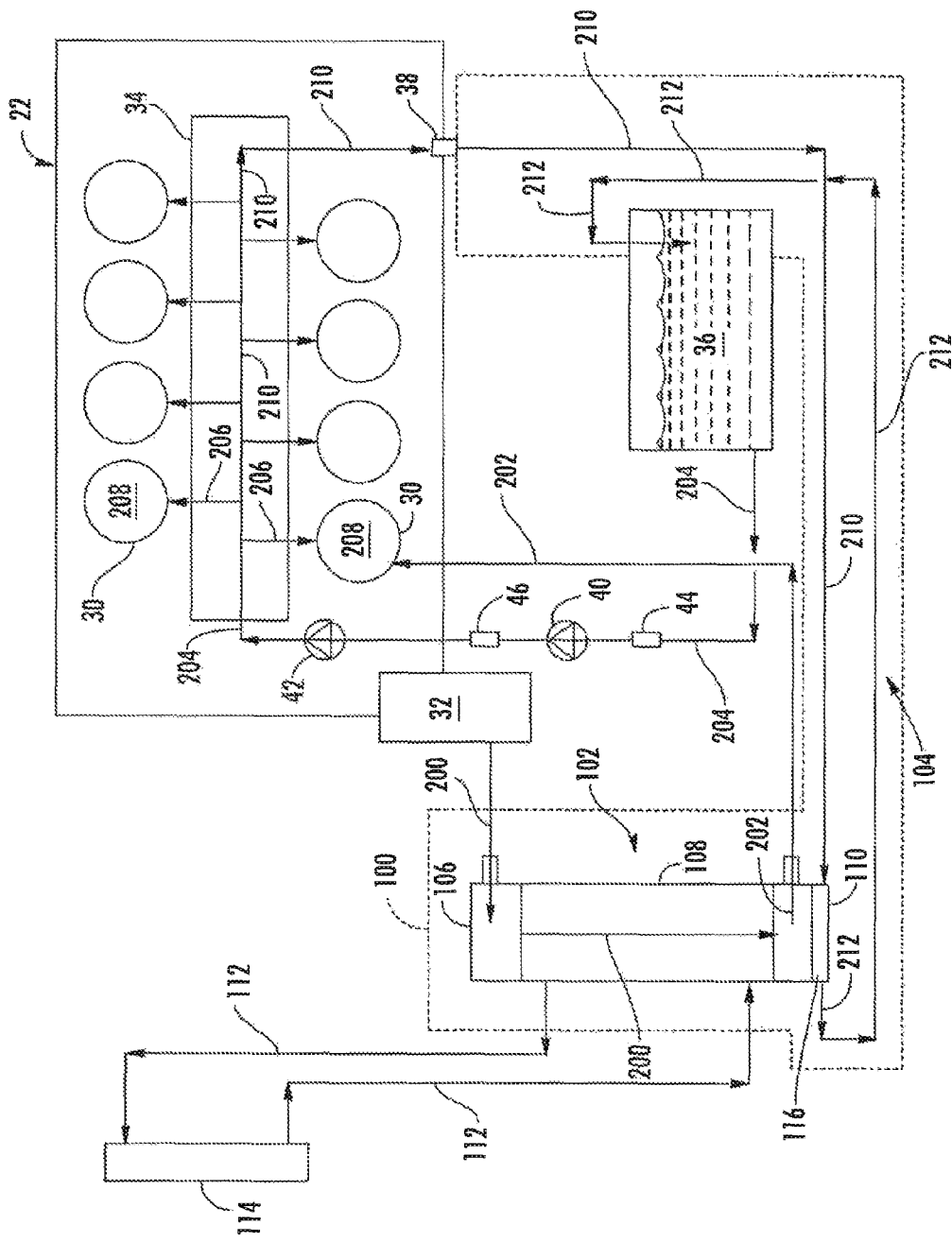
FIG. 2 illustrates a block flow diagram of an exemplary diesel engine as may be used in the work vehicle shown in FIG. 1 and includes a system for cooling charge air and excess fuel for a turbocharged diesel engine, according to at least one embodiment of the present invention.

FIG. 2 provides a flow diagram of the diesel engine 22 as shown in FIG. 1 and includes a system 100 for cooling charge air and excess fuel for a turbocharged diesel engine, herein referred to as "system", according to at least one embodiment of the present invention. In various embodiments, as shown in FIG. 2, the diesel engine 22 includes a plurality of piston or combustion chambers 30 defined within a block portion of the diesel engine 22. Each combustion chamber 30 is in fluid communication with a turbocharger 32 and a common rail fuel injection system 34. The common rail fuel injection system 34 is in fluid communication with a fuel supply or tank 36. In various embodiments, the diesel engine 22 includes a fuel outlet 38 that is in fluid communication with the common rail fuel injection system 34. In particular embodiments, the diesel engine 22 may include one or more pumps 40, 42, fuel filters 44, 46 or other fuel system related hardware downstream from the fuel supply 36 and upstream from the common rail fuel injection system 34.

In various embodiments, as shown in FIG. 2, the system 100 includes a charge air cooler 102 that is disposed downstream from the turbocharger 32 and upstream from the combustion chamber 30. The system 100 may also include a fuel recirculation system 104 that is in fluid communication with the fuel outlet 38 of the diesel engine 22, in thermal communication with the charge air cooler 102 and in fluid communication with the fuel supply 36. The charge air cooler 102 generally includes an inlet body 106, a heat exchanger 108 downstream from the inlet body 106 and an outlet body 110 disposed downstream from the heat exchanger 108 and that is in fluid communication with combustion chambers 30. The fuel recirculation system 104 may generally include multiple fuel lines or conduits that at least partially define a flow path from the fuel outlet 38 of the diesel engine 22 to the fuel supply 36.

The heat exchanger 108 may be any type of heat exchanger that is suitable for the intended purpose as provided herein. For example, the heat exchanger 108 may be a tube and shell, a stacked plate or other type heat exchanger. The heat exchanger 108 may be a liquid-to-air type or an air-to-air type heat exchanger. In particular embodiments, wherein the heat exchanger is a liquid-to-air type, a coolant as indicated by arrows 112 may be provided to the heat exchanger 108 via a low temperature radiator 114.

During operation of the diesel engine 22, as illustrated in FIG. 2, the turbocharger 32 provides heated compressed or "charge" air as indicated by arrows 200 to the inlet body 106 of the charge air cooler 102. The heated charge air 200 is routed from the inlet body 106 through the heat exchanger 108 where thermal energy is removed from the heated charge air 200, thus providing cooled charge air as indicated by arrows 202 to the outlet body 110 of the charge air cooler 102. For example, the heated charge air 200 may have a temperature of greater than 100 degrees Celsius as it enters the inlet body 106 and the cooled charge air 202 may have a temperature of 65 degrees Celsius or less as it flows out of the heat exchanger 108. In one embodiment, the cooled charge air 202 may have a temperature of between about 45 and about 55 degrees Celsius.

The cooled charge air 202 is then routed to the various combustion chambers 30 within the diesel engine 22. Simultaneously, a diesel fuel as indicated by arrows 204 is routed from the fuel supply 36 to the common rail fuel injection system 34 of the diesel engine 22 where a metered portion of the diesel fuel as indicated by arrows 206 is atomized into small droplets, vaporized, and mixed with the cooled charge air 202 to form a combustible mixture 208 within the combustion chamber 30. The combustible mixture 208 is burned within each combustion chamber 30. As the combustible mixture 208 is burned, combustion gases rapidly expand, thus causing pistons (not shown) to move and to rotate one or more crankshaft(s) (not shown) to which they are connected.

Because diesel engines generally draw more fuel than is needed for combustion, a heated excess portion of the fuel 204 as indicated by arrows 210 is not injected into the combustion chambers 30 and may be used to provide lubrication and/or cooling for various internal components of the diesel engine 22. As a result, the excess fuel 210 picks up thermal energy or heat from the various internal components and/or the combustion gases. After circulating through the diesel engine 22, the heated excess fuel 210 may be circulated back to the fuel supply 36. However, over time, the heat carried by the excess fuel 210 may elevate the temperature of the diesel fuel 204 within the fuel supply 36, thus potentially affecting engine performance and/or exceeding thermal limits of downstream fuel injection equipment.

In various embodiments, the heated excess fuel 210 is routed out of the diesel engine 22 via fuel outlet 38 and is then passed through one or more fuel passages 116 defined by or extending within the outlet body 110 of the charge air cooler 102 where thermal energy from the heated excess fuel 210 is transferred to the cooler cooled charge air 202 via conduction and/or convection, thereby reducing the temperature of the excess fuel 210 and providing a cooled excess fuel 212 back to the fuel supply 36.

Figure 3:
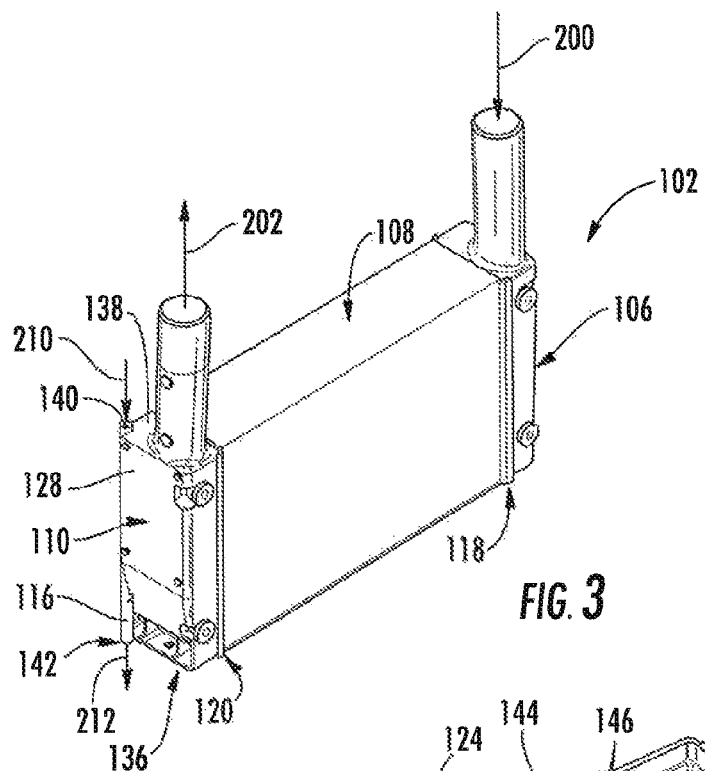
FIG. 3 illustrates a perspective side view of an exemplary charge air cooler according to at least one exemplary embodiment of the present invention.
Figure 4:
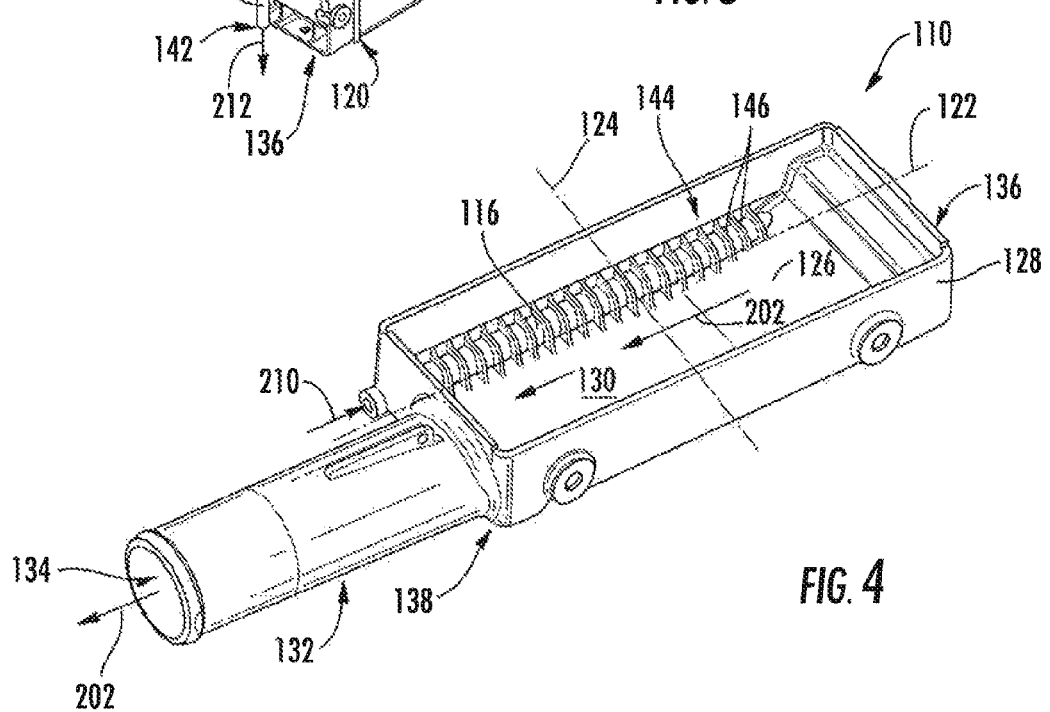
FIG. 4 illustrates a perspective view of an exemplary outlet body of the charge air cooler as shown in FIG. 3, according to one embodiment of the present invention.

FIG. 3 provides a perspective side view of an exemplary charge air cooler 102 according to at least one exemplary embodiment of the present invention. FIG. 4 provides a perspective view of an exemplary outlet body 110 as shown in FIG. 3 removed from the heat exchanger 108, according to one embodiment of the present invention. As shown in FIG. 3, the inlet body 106 may be attached to an upstream end 118 of the heat exchanger 108 and the outlet body 110 may be attached to a downstream end 120 of the heat exchanger 108. The inlet body 106 and/or the outlet body 110 may be removably mounted to the upstream and downstream ends 118, 120 respectfully. For example, the inlet body 106 and/or the outlet body 110 may be bolted, snapped to or otherwise mechanically coupled to the upstream and downstream ends 118, 120 respectfully. The inlet body 106 and/or the outlet body 110 may be fixedly connected to the respective upstream and downstream ends 118, 120 via welding, brazing or other like method.

As shown in FIG. 4, the outlet body 110 has a longitudinal centerline axis 122 and a lateral centerline axis 124 for reference purposes. The outlet body 110 generally includes an inner surface or side 126 and an outer surface or side 128. The inner surface 126 defines a flow passage or pocket 130 within the outlet body 110. The flow passage 130 is in fluid communication with the downstream end 120 of the heat exchanger 108 when mounted thereto.

In particular embodiments, the outlet body 110 may include a tubular portion 132 that is in fluid communication with the flow passage 130. The tubular portion 132 may at least partially define an outlet 134 of the outlet body 110 and may be fluidly coupled to the diesel engine 22 via a hose or conduit (not shown). In operation, the flow passage 130 receives the cooled charge air 202 from the heat exchanger 108. The cooled charge air 202 then flows out of the flow passage 130 via the outlet 134 and on to the combustion chambers 30 of the diesel engine 22.

In various embodiments, the fuel passage 116 is defined by or within the outlet body 110. For example, in one embodiment as shown collectively in FIGS. 3 and 4, the fuel passage 116 is defined by and/or within the outlet body 110 between the inner surface 126 and the outer surface 128. In other words, the fuel passage 116 may be defined underneath the inner surface 126. The fuel passage 116 may be formed or cast as part of the outlet body 110 and/or may be machined into the outlet body 110. The fuel passage 116 may extend generally longitudinally from or between a first end portion 136 and a longitudinally opposing second end portion 138 of the outlet body 110.

As shown in FIG. 3, the fuel passage 116 generally includes an inlet 140 that is in fluid communication with the engine outlet 38 and an outlet 142 disposed downstream from the inlet 140 and that is in fluid communication with the fuel supply 36. In particular embodiments, as shown in FIG. 3, the inlet 140 is dispose proximate to the second end portion 138 of the outlet body 110 and the outlet 142 is disposed proximate to the first end portion 136 of the outlet body 110. The positioning of the inlet 140 and the outlet 142 may be reversed depending on a desired flow direction through the fuel passage 116. Therefore, the inlet 140 and outlet 142 positions shown in FIG. 3 are not intended to be limiting unless otherwise provided in the claims.

In particular embodiments, as shown in FIG. 4, at least one heat transfer feature 144 may extend outwardly from the inner surface 126 of the outlet body 110 and into the flow passage 130 along the fuel passage 116. For example, as shown in FIG. 4, the heat transfer feature 144 may comprise of a plurality of fins 146. The fins 146 may be oriented in any direction that optimizes heat transfer from the excess fuel 210 flowing through the fuel passage 116 to the cooled charge air 202 flowing through the flow passage 130. For example, in one embodiment, as shown in FIG. 4, the plurality of fins 146 may extend generally laterally along the inner side 126. In one embodiment, the heat transfer feature 144 may include one or more longitudinally oriented fins. In operation, thermal energy from the excess fuel 210 is transferred through the inner surface 126 of the outlet body 110 and is absorbed by the cooled charge air 202 flowing through the flow passage 130, thereby cooling the excess fuel 210 and providing the cooled excess fuel 212 back to the fuel supply 36.

Figure 5:
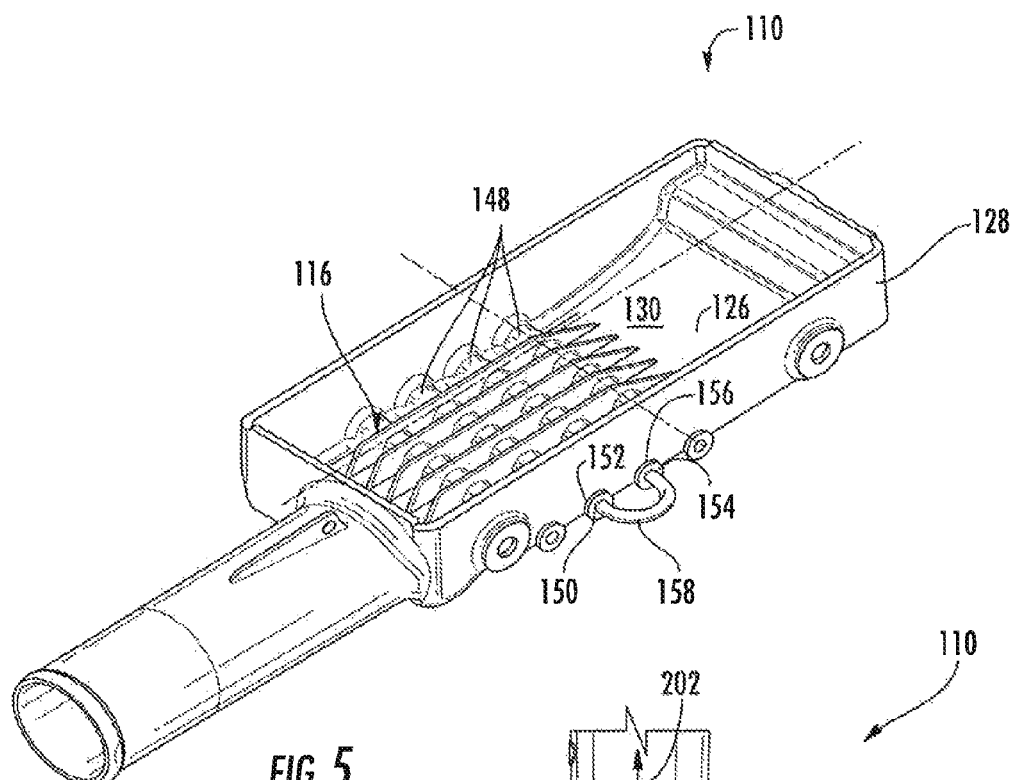
FIG. 5 illustrates a perspective view of an exemplary outlet body of a charge air cooler according to at least one embodiment of the present invention.

FIG. 5 provides a perspective view of an exemplary outlet body 110 as removed from the heat exchanger 108, according to at least one embodiment of the present invention. As shown in FIG. 5, the fuel passage 116 may comprise of a plurality of passages 148 that extend generally laterally across the inner surface 126 of the outlet body 110. In particular embodiments, the plurality of passages 148 are defined by the outlet body 110 between the outer surface 128 and the inner surface 126. Each passage of the plurality of passages 148 is fluidly coupled with one or more adjacent passages 148 to form a continuous fuel flow path through the outlet body 110. For example, in one embodiment, an outlet 150 of a first passage 152 of the plurality of passages 148 is in fluid communication with an inlet 154 of a longitudinally adjacent second passage 156 of the plurality of passages 148. The inlet 154 and the outlet 150 may be fluidly coupled via a tube 158 or other conduit. In the alternative, the passages 148 may form a continuous serpentine pattern within the outlet body 110 between the inner and outer surfaces 126, 128.

Figure 6:
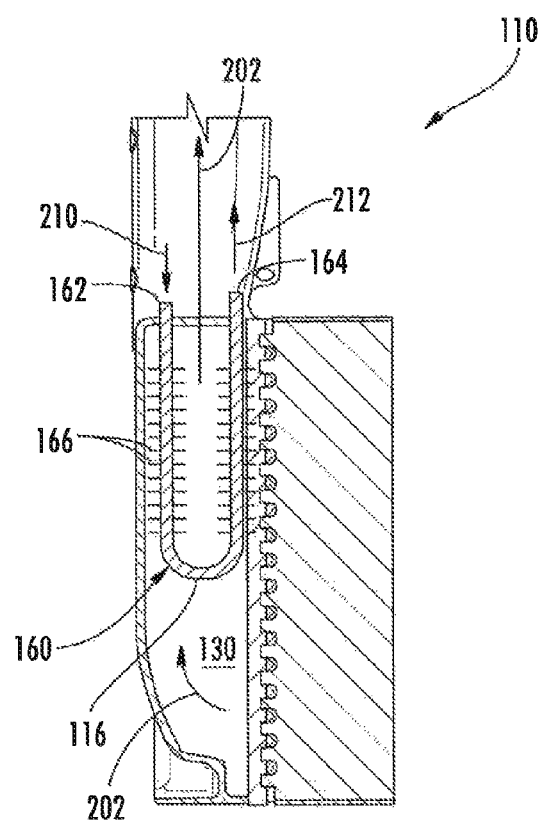
FIG. 6 illustrates a section view of an exemplary outlet body of a charge air cooler according to at least one embodiment of the present invention.

FIG. 6 provides a cross sectioned side view of an exemplary outlet body 110 according to at least one embodiment of the present invention, in particular embodiments, as shown in FIG. 6, the fuel passage 116 is defined by a tube or conduit 160 that extends through the outer surface 128 and the inner surface 126 into and back out of the flow passage 130. A first end 162 of the tube 160 is in fluid communication with the fuel outlet 38 to receive the excess fuel 208 and an opposing second end 164 of the tube 160 is in fluid communication with the fuel supply 36. The tube 160 is in thermal communication with the flow passage 130. In particular embodiments, the tube 160 may be formed from aluminum, copper or brass.

In particular embodiments, as shown in FIG. 6, the tube 160 may be in thermal communication with a plurality of fins 166 or other heat transfer features. The fins 166 may be oriented in any direction that optimizes heat transfer from the tube 160 and/or the fuel passage 116 to the cooled charge air 202 flowing though the flow passage 130. In operation, thermal energy from the excess fuel 210 is transferred through the portion of the tube 160 that extends within the outlet body 110 and is absorbed by the cooled charge air 202 flowing through the flow passage 130, thereby cooling the excess fuel 210.

Figure 7:
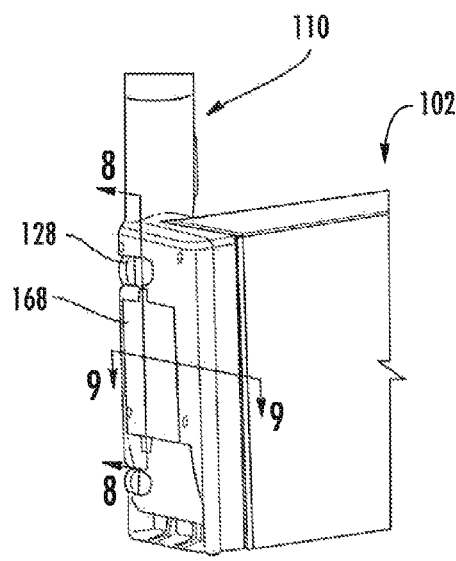
FIG. 7 illustrates a perspective view of a portion of an exemplary charge air cooler including an outlet body according to an exemplary embodiment of the present invention.
Figure 8:
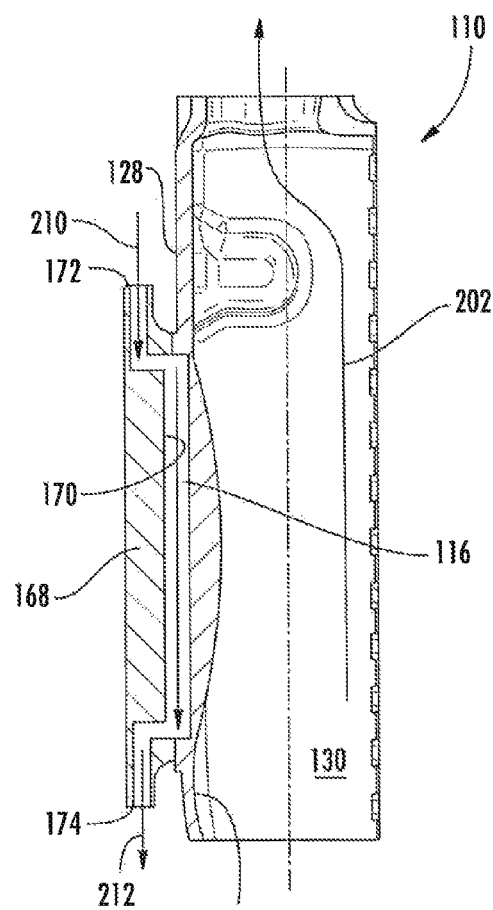
FIG. 8 provides a cross sectional side view of the outlet body taken along line 8-8 as shown in FIG. 7.
Figure 9:
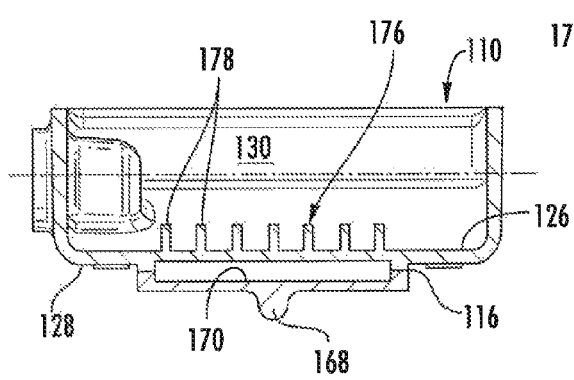
FIG. 9 provides a cross sectional top view of the outlet body taken along line 9-9 as shown in FIG. 7.

FIG. 7 provides a perspective view of a portion of the charge air cooler 102 including the outlet body 110 according to an exemplary embodiment of the present invention. FIG. 8 provides a cross sectional side view of the outlet body 110 taken along line 8-8 as shown in FIG. 7. FIG. 9 provides a cross sectional top view of the outlet body 110 taken along line 9-9 as shown in FIG. 7. In one embodiment, as shown in FIGS. 7, 8 and 9, a plate 168 is fixedly connected to the outer surface 128 of the outlet body 110.

As shown in FIGS. 8 and 9, the fuel passage 116 is defined between an inner surface 170 of the plate 168 and the outer surface 128 of the outlet body 110. As shown in FIG. 8, the plate 168 may at least partially define an inlet 172 and an outlet 174 that are in fluid communication with the fuel passage 116. The inlet 172 is in fluid communication with the fuel outlet 38 and the outlet 174 is in fluid communication with the fuel supply 36 and/or the common rail fuel injection system 34. The fuel passage 116 is in thermal communication with the flow passage 130 and the cooled charge air 202 via the outer and inner surfaces 126, 128 of the outlet body 110.

In particular embodiments, as shown in FIG. 9, at least one heat transfer feature 176 may extend outwardly from the inner surface 126 of the outlet body 110 and into the flow passage 130. For example, as shown in FIG. 9, the heat transfer feature 176 may comprise of a plurality of fins 178. The fins 178 may be oriented in any direction that optimizes heat transfer from the excess fuel 210 flowing through the fuel passage 116 and the inner surface 126 and/or the cooled charge air 202 flowing through the flow passage 130.

Figure 10:
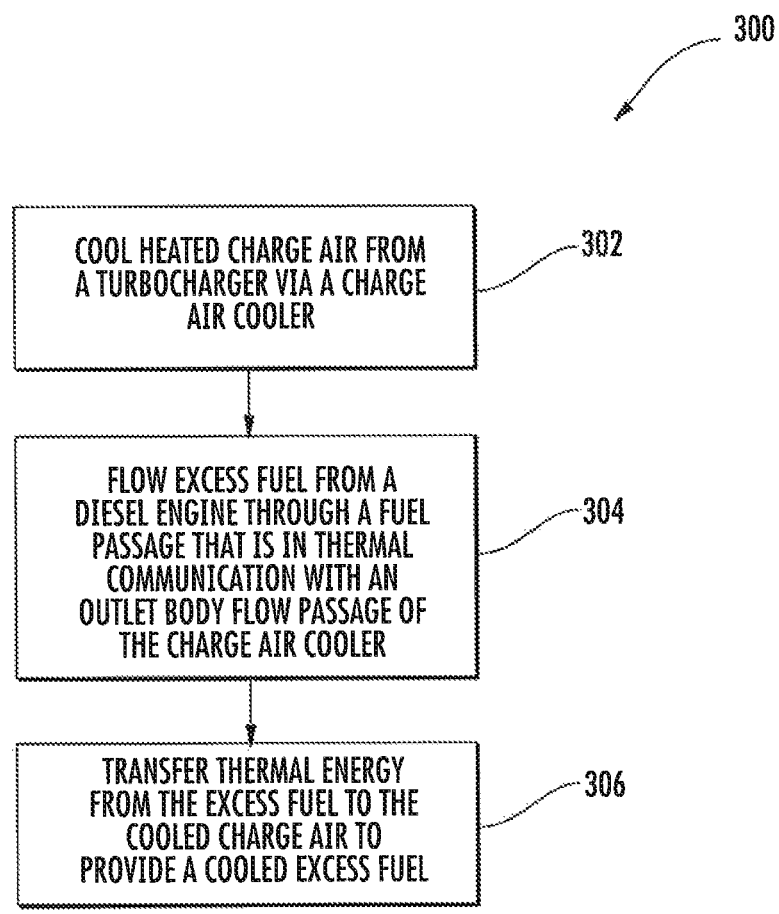
FIG. 10 is a flow diagram of a method for cooling charge air and excess fuel of a diesel engine.

FIG. 10 is a flow diagram of a method 300 for cooling charge air and excess fuel of a diesel engine. At 302, method 300 includes cooling the heated charge air 200 from the turbocharger 32 via the charge air cooler 102 to provide the cooled charge air 202 to the flow passage 130 defined by the outlet body 110. At 304, method 300 includes flowing the heated excess fuel 210 from the diesel engine 22 through the fuel passage 116. At step 306, method 300 includes transferring thermal energy from the heated excess fuel 210 to the cooled charge air 202 to provide a cooled excess fuel 212. Method 300 may further include flowing the cooled excess fuel 212 to at least one of the fuel supply 36 and/or the common rail fuel injection system 34. Method 300 may include flowing the cooled charge air 202 to the combustion chambers 30 of the diesel engine.

This written description uses examples to disclose the invention, including the best mode, and also to enable any person skilled in the art to practice the invention, including making and using any devices or cooling systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for cooling charge air and excess fuel for a turbocharged diesel engine, comprising:
   a charge air cooler having an inlet body, a heat exchanger disposed downstream from the inlet body and an outlet body disposed downstream from the heat exchanger, the outlet body including an inner surface that at least partially defines a flow passage within the outlet body, the flow passage being in fluid communication with the heat exchanger, wherein the inner surface of the outlet body is configured to be in direct contact with air flowing through the flow passage of the outlet body; and
   a fuel passage in thermal communication with the flow passage of the outlet body, the fuel passage being defined by at least a portion of the inner surface of the outlet body.

2. The system as in claim 1, wherein the outlet body comprises an outer surface, wherein the fuel passage is defined by the outlet body between the inner surface and the outer surface.

3. The system as in claim 1, wherein at least a portion of the fuel passage extends longitudinally along the inner surface of the outlet body.

4. The system as in claim 1, wherein at least a portion of the fuel passage extends laterally across the inner surface of the outlet body.

5. The system as in claim 1, wherein the fuel passage comprises a plurality of passages fluidly coupled together and that extend along the inner surface of the outlet body.

6. The system as in claim 1, further comprising a plurality of fins disposed along the inner surface and in thermal communication with the fuel passage and the flow passage.

7. A work vehicle, comprising:
a chassis;
a drivetrain attached to the chassis including a turbocharged diesel engine and a transmission;
a fuel supply in fluid communication with the diesel engine; and
a system for cooling charge air from the turbocharger and excess fuel from the diesel engine, the system comprising
a charge air cooler having an inlet body downstream from the turbocharger, a heat exchanger disposed downstream from the inlet body and an outlet body disposed downstream from the heat exchanger, the outlet body including an inner surface that at least partially defines a flow passage within the outlet body, the flow passage being in fluid communication with the heat exchanger, wherein the inner surface of the outlet body is configured to be in direct contact with air flowing through the flow passage of the outlet body; and
a fuel passage having an inlet in fluid communication with a fuel outlet of the diesel engine and an outlet in fluid communication with the fuel supply, the fuel passage being in thermal communication with the flow passage of the outlet body, the fuel passage being defined by at least a portion of the inner surface of the outlet body.

8. The work vehicle as in claim 7, wherein the outlet body comprises an outer surface, wherein the fuel passage is defined by the outlet body between the inner surface and the outer surface.

9. The work vehicle as in claim 7, wherein at least a portion of the fuel passage extends longitudinally along the inner surface of the outlet body.

10. The work vehicle as in claim 7, wherein at least a portion of the fuel passage extends laterally across the inner surface of the outlet body.

11. The work vehicle as in claim 7, wherein the fuel passage comprises a plurality of passages fluidly coupled together and that extend along the inner surface of the outlet body.

12. The work vehicle as in claim 7, further comprising a plurality of fins disposed along the inner surface and in thermal communication with the fuel passage and the flow passage.

* * * * *